United States Patent [19]
Kilty et al.

[11] Patent Number: 5,948,212
[45] Date of Patent: *Sep. 7, 1999

[54] TITANIUM SEPARATION PROCESS

[75] Inventors: Peter Anthony Kilty, Houston; Michael Philip Zum-Mallen; Michael Wayne Potter, both of Sugar Land, all of Tex.

[73] Assignee: Union Carbide Chemicals & Plastics Technology Corporation, Danbury, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/734,690

[22] Filed: Oct. 21, 1996

[51] Int. Cl.$^6$ .............................. B01D 3/10; C01G 23/02; C07C 17/383
[52] U.S. Cl. .................................. 203/29; 203/73; 203/80; 423/76; 423/492; 570/211
[58] Field of Search .................................. 203/73, 6, 80, 203/29, 69, 68, 38; 423/76, 77, 492; 570/211; 562/124, 114

[56] References Cited

U.S. PATENT DOCUMENTS

| | | | |
|---|---|---|---|
| 2,754,256 | 7/1956 | Stambaugh | 203/38 |
| 2,915,364 | 12/1959 | Clabaugh et al. | 423/76 |
| 2,958,574 | 11/1960 | Hansley et al. | 423/76 |
| 3,533,733 | 10/1970 | Clark et al. | 203/57 |
| 3,963,585 | 6/1976 | Winter et al. | 203/38 |
| 4,016,349 | 4/1977 | McKenna | 528/482 |
| 4,199,476 | 4/1980 | Melquist et al. | 526/124 |
| 4,329,253 | 5/1982 | Goodall et al. | 252/429 B |
| 4,719,271 | 1/1988 | Dietz | 526/114 |
| 4,728,705 | 3/1988 | Nestlerode et al. | 526/125 |
| 5,106,806 | 4/1992 | Job | 502/111 |
| 5,242,549 | 9/1993 | Potter et al. | 203/6 |

FOREIGN PATENT DOCUMENTS 947111  1/1964  United Kingdom .

Primary Examiner—Virginia Manoharan
Attorney, Agent, or Firm—P. A. Doody

[57] ABSTRACT

A process for the separation of a mixture of a titanium tetrahalide, a reaction diluent of an intermediate boiling point and at least one of a titanium alkoxide, ester or complex thereof without the aid of a distinct separation solvent by subjecting the mixture to a first distillation step to separate the titanium tetrahalide as the lights component and subjecting the heavies product to a second distillation step to recover a portion of the reaction diluent as the lights component.

13 Claims, 1 Drawing Sheet

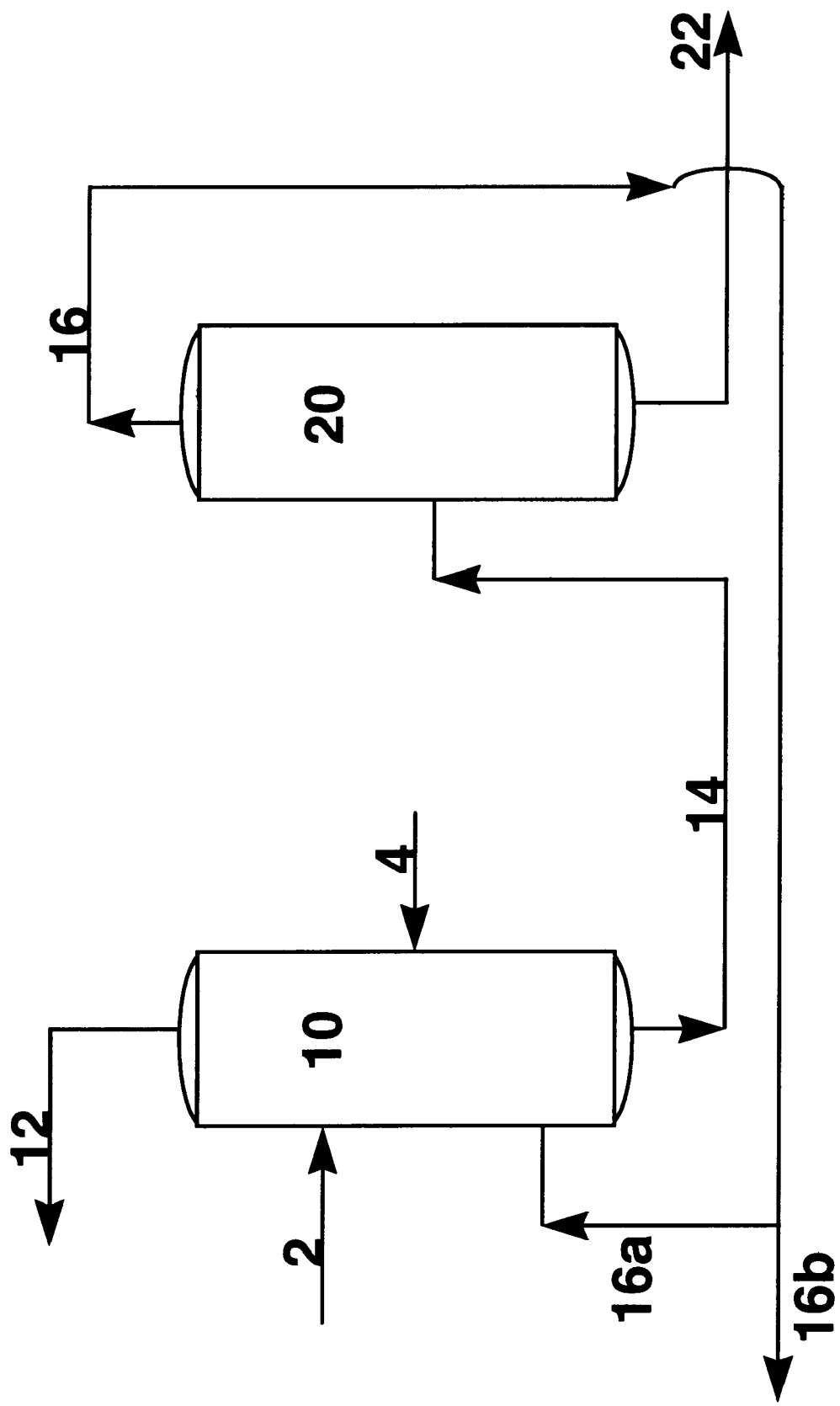

TITANIUM SEPARATION PROCESS

FIELD OF THE INVENTION

This invention relates to a process for the separation of mixtures of titanium complexes from a reaction diluent.

BACKGROUND OF THE INVENTION

The production of an active, stereoregular catalyst for the polymerization of alpha-olefins (particularly polypropylene) is frequently a complicated process with much of the complexity being encountered during the production of the olefin polymerization procatalyst. This procatalyst is frequently a titanium-containing solid and often contains moieties of magnesium and halide, particularly chloride. One class of procatalyst (as described in U.S. Pat. No. 4,728,705 to Nestlerode et al which is incorporated herein by reference) results from the reaction of a magnesium compound, often a magnesium alkoxide compound, with a tetravalent titanium halide in the presence of a reaction diluent and an electron donor which is often an alkyl ester of an aromatic monocarboxylic or dicarboxylic acid. The procatalyst is generally a solid material and is easily separated from the media of its production. The remaining waste product is a liquid material which contains at least some of unreacted titanium tetrahalide, reaction diluent, unreacted electron donor, and a wide array of titanium haloalkoxide compounds or complexes thereof with other titanium haloalkoxide compounds or aromatic esters.

This waste product presents a substantial disposal problem which adversely affects the economy of the polymerization process. It would be of advantage to be able to separate the components of such a waste stream and to recover for reuse the more valuable components of the product, such as titanium tetrahalide and the reaction diluent.

One such method of component separation is described in U.S. Pat. No. 5,242,549 to Potter et al. which provides for the separation of waste product components by a method wherein a separation solvent is added to the waste product, and the liquid components are separated by distillation. However, this process, disadvantageously, requires the use of two distinct solvents, a reaction diluent and a separation solvent.

SUMMARY OF THE INVENTION

The invention provides a process for the separation of titanium tetrahalide and halohydrocarbon reaction diluent from mixtures thereof with titanium alkoxide, titanium haloalkoxide and esters of aromatic acids without the aid of a distinct separation solvent. In a preferred embodiment, the amount of titanium tetrahalide recoverable by the separation process is greater than that quantity originally present in the mixture undergoing separation.

BRIEF DESCRIPTION OF THE DRAWINGS

The FIGURE depicts a separation scheme including a first distillation zone in which the titanium tetrahalide with some reaction diluent is separated from the remaining portion of the waste product. In a second distillation zone the reaction diluent is separated from waste product components.

DETAILED DESCRIPTION OF THE INVENTION

The process of the invention comprises the separation and recovery of titanium tetrahalide, e.g., $TiCl_4$, and a reaction diluent, e.g., halohydrocarbons and preferably, ortho-chlorotoluene (OCT), from mixtures with at least one of titanium compounds, aromatic esters or complexes thereof. More particularly, the mixture undergoing separation by the process of the invention is a complex mixture of titanium tetrahalide, titanium alkoxides and haloalkoxides, alkyl esters of aromatic acids and reaction diluent. The various complexes of titanium encompassed in the mixture, may include, but are not limited to, alkoxy compounds with other titanium alkoxy compounds or with the aromatic esters. Although the process is broadly applicable to separation of such a mixture independent of its origin, the process is particularly applicable to the separation of a liquid waste product resulting from the production of titanium-containing, magnesium-containing, halide-containing olefin polymerization procatalyst prepared by contacting a magnesium alkoxide (including, but not limited to, carbonized magnesium alkoxides, magnesium alkoxide halides, mixed magnesium titanium alkoxide halides [e.g., $TiMg_3(OEt)_8Cl_2$]) with titanium tetrahalide in the presence of a reaction diluent.

In the process of the invention, the reaction diluent has a boiling point intermediate to the titanium tetrahalide (e.g., $TiCl_4$, has an atmospheric boiling point of 136° C.) and the mixture of titanium alkoxy compounds (generally atmospheric boiling points of about 185° C. to about 260° C.), esters and complexes thereof. Although the boiling point of the reaction diluent should be intermediate at atmospheric pressure, it is important that it be intermediate at the distillation conditions. For example, if the distillations are run at reduced pressure, it is at this reduced pressure that the boiling point should be intermediate.

A variety of reaction diluents are useful provided that the atmospheric boiling point of the reaction diluent is higher than that of the $TiCl_4$, but lower than the lowest boiling of the titanium haloalkoxides at the distillation operating conditions and that they have sufficient solubility characteristics for the components of the mixture undergoing separation to remain in solution. Such diluents could include aliphatic solvents (e.g., o-xylene, mesitylene, n-propyl-benzene or decane), but preferred reaction diluents are aromatic solvents, including dichlorobenzenes and chlorotoluenes. Particularly preferred as reaction diluent is OCT.

The preferred titanium tetrahalide is $TiCl_4$. The preferred aromatic esters are alkyl benzoates, such as ethyl benzoate and ethyl p-ethyl benzoate, and alkyl phthalates, such as diethyl phthalate or diisobutyl phthalate.

This mixture undergoes a first distillation which separates the titanium tetrahalide from the other mixture components, including the most of the reaction diluent, without the formation of insoluble compounds. The titanium tetrahalide, being the most volatile of the mixture, would be the lights component and would come out overhead in a column distillation. Optionally, but not preferably, additional reaction diluent is added to the waste product prior to or during an initial distillation of the waste product. However, no separation solvent is required and preferably the process is free of such an additional solvent. A portion of the reaction diluent is then separated from the remaining mixture components in a second distillation step. The reaction diluent would be the lights part of the distillation and would come out overhead in a column distillation. The remainder of the mixture would be the heavies component and would be the bottoms portion from a distillation column. Some reaction diluent is necessary as a carrier for the bottoms mixture. The titanium tetrahalide from the first step is suitably recycled for use in the manufacture of further olefin polymerization procatalyst and the recovered reaction diluent from the second distillation step may be recycled to reactions or optionally, to the first distillation step for use in further separations.

The lack of the need of a separation solvent herein, as is clear, reduces the number of solvents in the system, thereby providing both an economic and environmental benefit. Moreover, recycling of one solvent (the reaction diluent) may be handled more readily than of two.

It is apparent that during the overall separation process of the invention certain chemical transformations take place in addition to the separations. It is known, for example, from Field et al, "The Organic Chemistry of Titanium", pages 51–54, Butterworths, London (1965), that during vacuum distillation of titanium trichlorobutoxide, the titanium trichlorobutoxide undergoes apparent disproportionation to produce titanium dichlorodibutoxide and titanium tetrachloride. Some analogous process apparently takes place during the present separation process and the proportion of titanium tetrachloride obtainable by the present process is generally greater than that present in the initial waste product undergoing separation. At the same time, the concentration of higher titanium alkoxides in the mixture undergoing separation also increases which apparently decreases the tendency of the mixture to form insoluble complexes of titanium chloroalkoxy compounds.

The quantity of reaction diluent to be added to the waste product mixture to be separated is not critical since it may be none. A quantity of reaction diluent of up to double the waste product volume may be added, however.

It is preferred that the two distillation zones are operated at reduced pressures to reduce the temperatures of the distillations. Typical distillation pressures are from about 50 mbar to about 200 mbar. At such pressures, the titanium tetrahalide/reaction diluent is removed from the upper portion of the distillation zone at temperatures on the order of from about 50° C. to about 70° C. and the lower portion of the zone will also be maintained from about 80° C. to about 105° C. The second distillation zone preferably should operate at a temperature range of from about 50° C. to about 80° C. at the top of the column and from about 80° C. to about 120° C. at the bottom of the column.

The process of the invention, in a preferred embodiment, comprises distilling in a first distillation zone a product mixture comprising titanium tetrachloride, reaction diluent of an intermediate boiling point at distillation pressure, preferably from about 60° C. to about 80° C. at reduced pressure, and at least one of titanium tetraalkoxide, titanium chloroalkoxide compounds, esters of aromatic acids and complexes thereof. It is noted that batch distillation processes may also be used. The mixture may contain a variety of alkoxide moieties, most commonly, however, each alkoxide of the mixture to be separated is ethoxide. The distillation is conducted at reduced pressure, producing a distillate containing predominantly titanium tetrachloride and some reaction diluent and a bottoms product comprising the remainder of the mixture, including most of the reaction diluent. The bottoms product then is passed to a second distillation zone, also operating at reduced pressure, where some portion of the reaction diluent is recovered from the top of the zone. The bottoms product from the second distillation zone is removed and ultimately passes to waste disposal or further processing. The bottoms product may still contain some reaction diluent to maintain waste solubility.

DESCRIPTION OF THE FIGURES

The FIGURE depicts a first distillation zone 10 which is shown as a single column, but could alternatively be multiple columns. A suitable column is a packed column of from 2 to 4 sections, each of which has multiple stages. Other types of conventional reduced pressure, multiple stage columns are also suitable. Typical operation of the zone is at about 100 mbar with a temperature varying from about 55° C. at the top of the zone to about 95° C. at the bottom. Entering the column 10 via line 2 is a waste product stream illustratively obtained from olefin polymerization procatalyst production facilities (not shown) which contains, preferably, titanium tetrachloride, reaction diluent, tetravalent titanium chloroethoxy compounds, organic esters, e.g., ethyl benzoate or diisobutyl phthalate, and complexes of the titanium chloroethoxy compounds with other titanium chloroethoxides or organic esters. Optionally, additional reaction diluent may be provided during operation by the optional recycle line 16a from the second distillation zone 20 and/or by make-up diluent introduced through optional line 4. Titanium tetrahalide and some reaction diluent is obtained from the upper portion of column 10 by line 12. This mixture is returned to atmospheric pressure and is suitable for use in the procatalyst production facilities. The bottoms product of column 10 is removed by line 14 and passed to a second distillation zone 20 which is also depicted as a single column although multiple columns would also be satisfactory. Column 20 is suitably a two section column with multiple stages in the upper section and in the lower section. Other forms of multiple stage columns are also useful. From the top of column 20 is withdrawn reaction diluent via line 16 and may be recycled to the catalyst production process (not shown) through line 16b or optionally to the first distillation column 10 through line 16a. The bottoms product of column 20 comprising reaction diluent, organic esters and a mixture of titanium haloalkoxides is removed through line 22 and is passed to disposal. Typical operation of column 20 will be at a pressure of about 100 mbar with a temperature in the upper portion of the column of about 70° C. and a temperature of about 105° C. in the lower portion.

It should be appreciated that the FIGURE and the accompanying discussion depict a simplified processing scheme and in actual operation the process will employ pumps, reboilers, rectifiers and/or other mechanical features as will be apparent to one skilled in this art.

We claim:

1. A process comprising (a) distilling at selected distillation conditions a mixture consisting essentially of titanium tetrahalide, reaction diluent and at least one of titanium tetraalkoxide, tetravalent titanium haloalkoxy compounds, alkyl esters of aromatic carboxylic acids and complexes thereof, without the aid of a distinct separation solvent, wherein the reaction diluent has a boiling point intermediate to (1) the boiling point of the titanium tetrahalide and (2) the boiling point of the remaining mixture components at the selected distillation conditions to obtain titanium tetrahalide as a lights component and to obtain a heavies component; and (b) distilling the heavies component of the first distillation step (a) to obtain some reaction diluent as a lights component and the remaining product as a heavies component.

2. The process of claim 1 wherein the titanium tetrahalide is $TiCl_4$.

3. The process of claim 2 wherein each distillation step is conducted at reduced pressure.

4. The process of claim 1 wherein each distillation step is conducted at reduced pressure.

5. The process of claim 4 wherein the reaction diluent is chlorotoluene.

6. The process of claim 4 wherein the first distillation step (a) is conducted in a distillation column at a pressure from about 50 mbar to about 200 mbar and in a temperature range from about 50° C. to about 70° C. at the top of the column to from about 80° C. to about 105° C. at the bottom of the column.

7. The process of claim 6 wherein the second distillation step (b) is conducted in a distillation column at a pressure from about 50 mbar to about 200 mbar and within a temperature range of from about 50° C. to about 80° C. at the top of the column and from about 80° C. to about 120° C. at the bottom of the column.

8. The process of claim 1 where the reaction diluent is selected from the group consisting of o-xylene, mesitylene, n-propyl-benzene, decane, dichlorobenzene, chlorotoluene and mixtures thereof.

9. The process of claim 8 wherein the first distillation step (a) is conducted in a distillation column at a pressure from about 50 mbar to about 200 mbar and in a temperature range from about 50° C. to about 70° C. at the top of the column to from about 80° C. to about 105° C. at the bottom of the column.

10. The process of claim 9 wherein the second distillation step (b) is conducted in a distillation column at a pressure from about 50 mbar to about 200 mbar and within a temperature range of from about 50° C. to about 80° C. at the top of the column and from about 80° C. to about 120° C. at the bottom of the column.

11. The process of claim 10 wherein the alkoxide of said titanium tetraalkoxide is ethoxide.

12. The process of claim 11 wherein the reaction diluent is chlorotoluene.

13. The process of claim 12 wherein the amount of titanium tetrahalide separated in the first distillation step (a) is greater than the amount of titanium tetrahalide present in the mixture before the first distillation step (a).

\* \* \* \* \*